United States Patent [19]

Sheets

[11] Patent Number: 4,467,149
[45] Date of Patent: Aug. 21, 1984

[54] COMPENSATION METHOD AND APPARATUS FOR USE WITH NONIDEAL TEST ACCESS LINES

[75] Inventor: Laurence L. Sheets, St. Charles, Ill.

[73] Assignee: AT&T Bell Laboratories, Murray Hill, N.J.

[21] Appl. No.: 465,534

[22] Filed: Feb. 10, 1983

[51] Int. Cl.³ .............................................. H04M 3/22
[52] U.S. Cl. ......................... 179/175.23; 179/175.3 R
[58] Field of Search .................. 179/175.3 R, 175.2 B, 179/175.21, 175.23; 340/825.94, 825.89, 825.85; 364/483, 514

[56] References Cited

U.S. PATENT DOCUMENTS 4,401,861 8/1983 Braun et al. ................. 179/175.3 R

OTHER PUBLICATIONS

Numerical Methods for Scientists and Engineers, by R. W. Hamming, copyright 1962, Section 8.3, pp. 94–97.
"Peripheral System Architecture and Circuit Design", The Bell System Technical Journal, vol. 61, No. 4, Apr. 1982, pp. 451–489.

Primary Examiner—Stafford D. Schreyer
Attorney, Agent, or Firm—K. H. Samples; R. T. Watland

[57] ABSTRACT

An arrangement to compensate for the leakage and biasing characteristics associated with the semiconductor crosspoints of a concentrator to allow accurate telephone subscriber loop measurements to be made through the concentrator. A compensation current is supplied which varies linearly with the applied test voltage according to a relationship that is determined adaptively just prior to the test so that the effects of device differences and temperature variations are minimized. The approach is extended to nonlinear compensation.

14 Claims, 8 Drawing Figures

COMPENSATION METHOD AND APPARATUS FOR USE WITH NONIDEAL TEST ACCESS LINES

TECHNICAL FIELD

The present invention relates to compensation arrangements for use with nonideal test access lines, and, more particularly, to such arrangements for use when testing through switching networks comprising semiconductor crosspoints.

BACKGROUND OF THE INVENTION

Telephone switching centers generally include switching networks which comprise a number of input and output terminals and a number of crosspoints. The individual crosspoints are selectively controlled to complete communication paths between the input and output terminals of the network. Historically, network crosspoints have comprised metallic contacts which were electrically, highly isolated from the control circuitry used to control them. With advances in semiconductor technology, semiconductor devices are being used in place of the metallic crosspoints. The use of such semiconductor devices tends to increase the speed of network operation and to reduce the size. Typical semiconductor crosspoints, however, allow a significant leakage current to flow from the control circuitry to a communication path that is established through a network of the crosspoints. This is true not only for the conductive crosspoints comprising the communication path but also for the many nonconductive crosspoints connected to that path. The leakage current that flows through each crosspoint varies with temperature, the voltage applied to the communication path and the particular device characteristics of that crosspoint. In addition, biasing resistors are typically distributed throughout the network to prevent the leakage current from so charging the communication paths that the crosspoints become conductive in an uncontrolled manner. The current which flows through these biasing resistors can vary even more significantly with the applied voltage than does the leakage current.

When voltage is applied via ideal test access lines to an open circuit, no current flows in those lines. The current which flows in a communication path of a semiconductor crosspoint network connected to an open circuited telephone subscriber loop due to the above-described leakage and biasing characteristics, also flows when any subscriber loop measurements are made through that network. Such current reduces measurement accuracy unless it is compensated for. Known compensation arrangements, which involves supplying fixed currents or connecting fixed negative resistances to communication paths, are unable to adequately account for the above-described variations with temperature and applied voltage or for the variations between different selected network paths when very accurate measurements are required. In view of the foregoing, a recognized problem in the art is the difficulty in making accurate measurements through a semiconductor crosspoint network having the above-described leakage and biasing characteristics.

SUMMARY OF THE INVENTION

The aforementioned problem is advantageously solved and a technical advance is achieved in accordance with the principles of the invention in a compensation method and apparatus for use with nonideal test access lines, such as the communication paths through a semiconductor crosspoint network, wherein a voltage-current characteristic of a particular network path is determined just prior to testing via that path and wherein a current is supplied to the path in accordance with the determined characteristic during testing.

According to an illustrative method in accordance with the present invention, a voltage supply successively applies test voltages $V_i$, for successive integers i from one through n, to a test access line, where n is a positive integer greater than one. A current source supplies, for each of the test voltages $V_i$ applied to the test access line, a current $I_i$ to the test access line of magnitude and polarity such that substantially no current flows through the voltage supply. For each of the test voltages $V_i$, a constant $K_i$ is determined such that $$I_i = K_i \prod_{\substack{j=1 \\ j \neq i}}^{n} (V_i - V_j),$$

where the symbol "$\Pi$" refers to product, as defined later herein. For any voltage, V, subsequently applied to the test access line by a voltage supply, the current source supplies to the test access line the magnitude and polarity of current defined by $$I(V) = \sum_{i=1}^{n} \left[ K_i \prod_{\substack{j=1 \\ j \neq i}}^{n} (V - V_j) \right]$$

to compensate for the variation of the test access line from an ideal insulated line.

BRIEF DESCRIPTION OF THE DRAWING

A more complete understanding of the invention may be obtained from a consideration of the following description when read in conjunction with the drawing in which.

DETAILED DESCRIPTION

Figure 1:
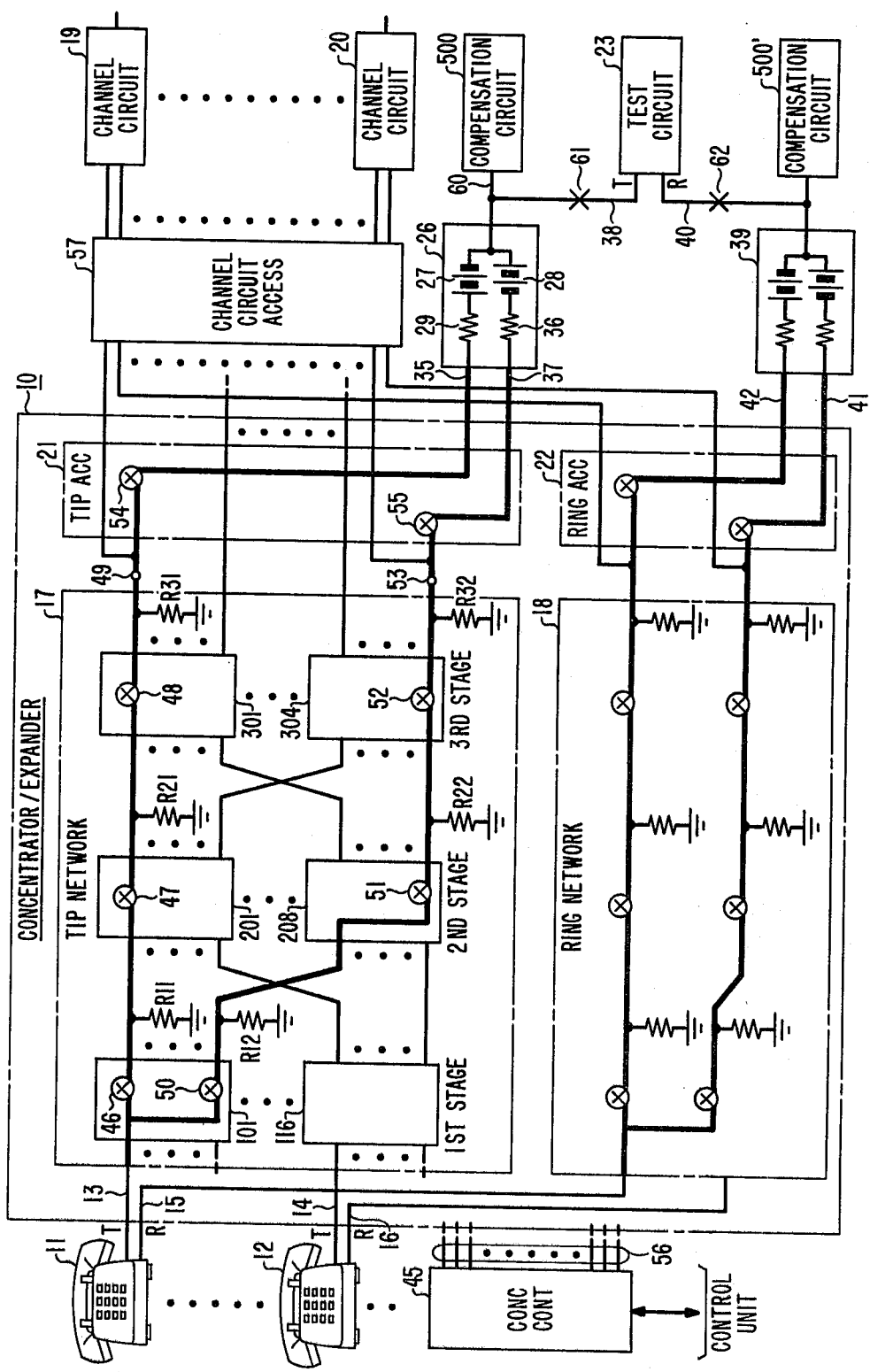
FIG. 1 is a block diagram of a portion of a telephone concentrator arrangement embodying the present invention.

FIG. 1 is a block diagram of a portion of a telephone concentrator/expander arrangement embodying the present invention for testing subscriber loops. This concentrator arrangement may be used in time division switching systems such as, that disclosed in E. H. Hafer et al., U.S. Pat. No. 4,280,217. The present embodiment includes a concentrator/expander 10 to which up to 512 subscriber sets such as subscriber sets 11 and 12 can be connected. Each subscriber set 11 and 12 is connected to concentrator/expander 10 by a respective one of tip conductors 13 and 14 and a respective one of ring conductors 15 and 16. Concentrator/expander 10 includes a tip network 17 to which tip conductors 13 and 14 are connected and a ring network 18 to which ring conductors 15 and 16 are connected. Tip network 17 and ring network 18 could be combined into the same network, however, they have been shown separately in the present embodiment for ease of understanding. Further, since both the tip network 17 and ring network 18 are substantially identical, only the tip network is shown and described in detail.

Concentrator/expander 10 can bidirectionally connect up to 64 subscriber sets, e.g., 11 and 12 to 64 channel circuits such as channel circuits 19 and 20. Accordingly, concentrator/expander 10 has an 8-to-1 concentration (expansion) ratio. Tip network 17 includes three switching stages, each comprising switch modules, e.g., switch module 101, having 32 input terminals and 16 output terminals. The first switching stage comprises 16 switch modules 101 through 116 to accommodate 512 subscriber set connections. The second stage comprises eight switch modules 201 through 208 to connect to the 256 output terminals of the first stage. The third stage comprises four switch modules 301 through 304 to selectively connect the 128 second stage output terminals to the 64 channel circuits, e.g., 19 and 20. Channel circuits 19 and 20 are connected to the output terminals of tip network 17 and ring network 18 by a channel circuit access network 57. Channel circuit access network 57 is controlled to selectively disconnect channel circuits 19 and 20 from the output terminals of tip network 17 and ring network 18 when the continued connection of such channel circuits could distort test results or subject the channel circuit to unnecessary high level signals.

Each switch module comprises a 32 by 16 matrix of crosspoints. In order to connect a given subscriber set to a given channel circuit, one selected crosspoint in each switch stage must be controlled to be conductive. The individual crosspoints of the present embodiment are controlled by a concentrator controller 45. Concentrator controller 45 operates in response to commands from a control unit (not shown) to apply control signals to a plurality of control conductors 56, one of which controls each crosspoint. A more detailed description of the control signals is given later herein. Further, the interaction of concentrator controller 45 and a control unit can be found in the above-mentioned Hafer et al. patent. Since one crosspoint in each switching stage is closed to provide a path through the concentrator/expander 10, the signals on a given tip conductor, e.g. 13, will pass through three crosspoints between a subscriber set and the output terminals of a given third stage switch module. Since the construction of ring network 18 is substantially identical to tip network 17, signals from a given subscriber set on the ring conductor, e.g., 15 also pass through three crosspoints between the subscriber set and the output terminals of the third stage switch module.

Frequently, subscriber loops are tested to determine their electrical characteristics. Such tests include a line leakage test, which measures the resistance between tip and ring conductors, and ringer check which measures impedance of the subscriber set ringing circuit. In the present embodiment, test signals which are generated and interpreted in a test circuit 23 are applied between the tip and ring conductors of a subscriber set through concentrator/expander 10. A tip access circuit 21 which consists of a 2 by 64 matrix of crosspoints provides selective connection between the test circuit 23 and the tip network output terminals, e.g., 49 and 53. A ring access circuit 22 also comprises a 2 by 64 matrix of crosspoints to provide selective connection between test circuit 23 and the ring network output terminals. One crosspoint of tip access circuit 21 must be closed to connect each tip network 17 output terminal to test circuit 23. Similarly, one crosspoint of ring access circuit 22 must be closed to connect each ring network 18 output terminal to test circuit 23. Thus, four crosspoints exist in each completed path between each of the subscriber loop conductors and test circuit 23. The crosspoints of tip access circuit 21 and ring access circuit 22 are controlled by concentrator controller 45.

Figure 2:
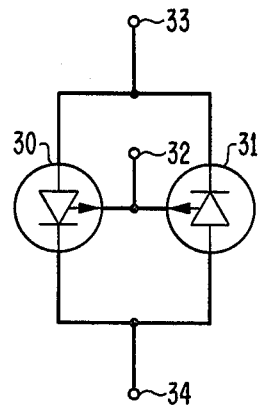
FIG. 2 is a symbolic representation of a semiconductor crosspoint used in the embodiment of FIG. 1.

FIG. 2 is a symbolic representation of the crosspoints utilized in the present embodiment. Each crosspoint comprises two gated diode switches (GDS) of the type described in detail in A. R. Hartman et al., application Ser. No. 248,192, filed Mar. 27, 1981 now abandoned. Each gated diode switch has an anode, cathode and a gate electrode and is normally conductive from anode to cathode until the voltage applied to the gate lead exceeds by a predetermined amount the higher of the voltages applied to the anode or the cathode. A voltage which exceeds the anode or cathode voltage by 30 to 40 volts is adequate to make the gated diode switch nonconductive. The crosspoint shown in FIG. 2 comprises gated diode switches 30 and 31 which have their gate electrodes connected together at a terminal 32. The anode of gated diode switch 30 is connected to the cathode of gated diode switch 31 at a terminal 33, and the anode of gated diode switch 31 is connected to the cathode of gated diode switch 30 at a terminal 34. The main conduction path of the crosspoint is between terminals 33 and 34 and is bidirectional. When the voltage applied to the gate terminal 32 exceeds the above-mentioned predetermined amount, the crosspoint is relatively nonconductive (off-state) in both directions. Bidirectional conduction exists when the voltage at terminal 32 is less than the predetermined amount (on-state).

Figure 3:
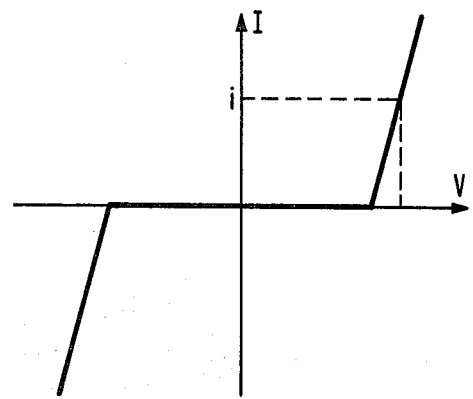
FIG. 3 is a characteristic curve for the crosspoint shown in FIG. 2.

When conducting, a gated diode switch exhibits a voltage drop of approximately 2 volts between its anode and cathode. The actual voltage drop varies based on the particular device, the voltage applied and the current applied. However, for the present example, a 2-volt voltage drop between anode and cathode is assumed. FIG. 3 is a voltage-current plot of a crosspoint of the type shown in FIG. 2 in the on-state.

Figure 4:
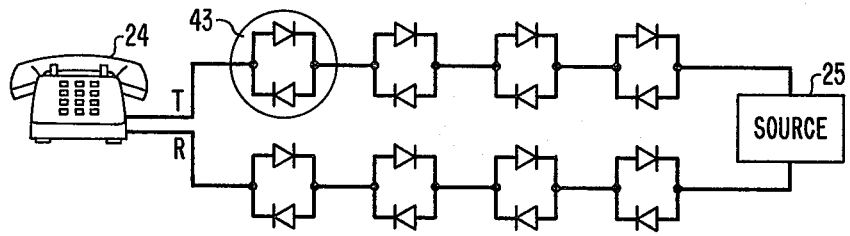
FIGS. 4 and 5 are symbolic representations of communication paths established through the embodiment of FIG. 1.

FIG. 4 is a symbolic representation of a communication path established between a subscriber set 24 and a signal source 25 through four network stages. Both the tip and ring communication paths include four gated diode switch crosspoints 43, each of which is shown as a pair of oppositely connected diodes. This representation is used since a gated diode switch crosspoint in the on-state has similar characteristics to two oppositely connected diodes. When a signal is applied by signal source 25 to the subscriber set 24, it passes through eight gated diode switch crosspoints and the subscriber set before returning to the source. As discussed above, each gated diode switch crosspoint exhibits a voltage drop of 2 volts giving a combined voltage drop of 16 volts for the eight gated diode switch crosspoints. This voltage drop requires that large (in excess of 16 volts) signals must be transmitted through the network, and that any AC signals transmitted will be distorted at a point centering around zero volts.

Linearizing Source 26

The embodiment of FIG. 1 provides an arrangement for linearizing the conduction characteristics of a communication path of the type shown in FIG. 4. The connection between test circuit 23 and the tip access circuit 21 includes a linearizing source 26 (FIG. 1). Linearizing source 26 comprises a DC voltage source 27, the negative terminal of which is connected to the positive terminal of a voltage source 28 and to a conductor 60 which is connected via a switch 61 and a conductor 38 to test circuit 23. The positive terminal of voltage source 27 is connected through a resistor 29 to a conductor 35. Similarly, the negative terminal of voltage source 28 is connected through a resistor 36 to a conductor 37. Conductors 35 and 37 are each connected to tip access circuit 21 which can selectively connect conductors 35 and 37 to any of the output terminals of tip network 17. Since the crosspoints of the present embodiment provide bidirectional communiation, both voltage sources 27 and 28 could be reversed to achieve the same results. Regardless of their orientation, the voltage sources 27 and 28 should, however, be connected in a series-aiding relationship. The connection between test circuit 23 and the ring access circuit 22 includes a similar linearizing source 39. Linearizing source 39 includes two voltage sources and two resistors which are connected in a manner substantially identical to the voltage sources and resistors of linearizing source 26. Additionally, test circuit 23 is connected to linearizing source 39 via a conductor 40 and a switch 62 and linearizing source 39 is connected to ring access circuit 22 via two conductors 41 and 42. Conductors 41 and 42 can be selectively connected to any of the output terminals of ring network 18 by ring access circuit 22.

When a test is to be applied to a given subscriber loop, for example the loop consisting of conductors 13 and 15 and subscriber set 11, two communication paths are established through the concentrator/expander 10 between the tip conductor 13 of the subscriber loop under test to two selected output terminals, e.g., 49 and 53 of the third tip network stage. These paths are shown as heavy lines in FIG. 1, with conducting crosspoints of the paths being represented as a ⊗. The first communication path extends from tip conductor 13 through crosspoints 46, 47 and 48 to tip network output terminal 49. The second communication path extends from tip conductor 13 through crosspoints 50, 51 and 52 to tip network output terminal 53. Additionally, a crosspoint 54 of tip access circuit 21 is controlled to connect tip network output terminal 49 to conductor 35, and a crosspoint 55 is controlled to connect tip network output terminal 53, to conductor 37. A similar pair of communication paths is established through ring network 18 and ring access circuit 22 between ring conductor 15 of the loop under test and conductors 41 and 42.

Figure 5:
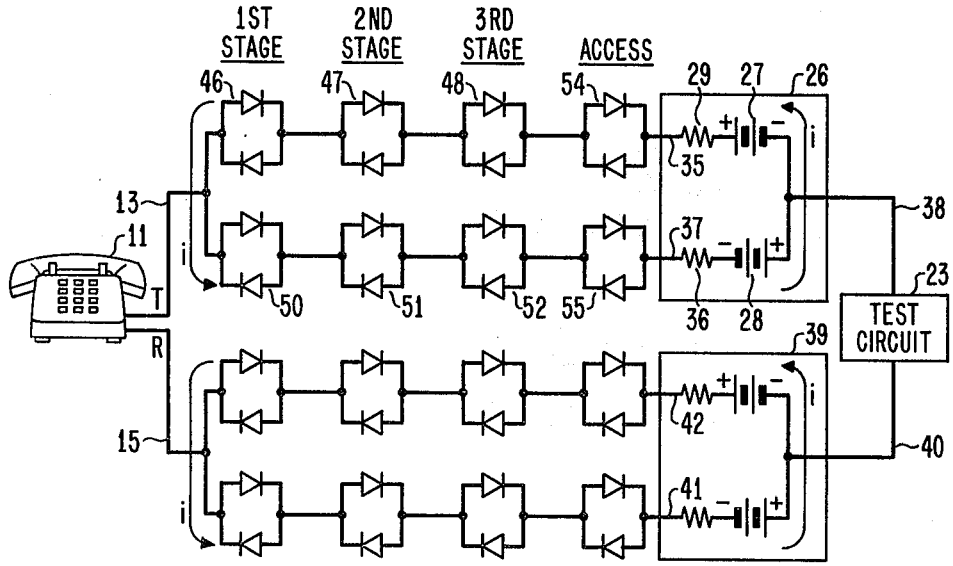

A symbolic representation of the communication paths established between test circuit 23 and the subscriber set 11 is shown in FIG. 5. The two tip network paths to tip conductor 13 and the connection of voltage sources 27 and 28 forms a complete circuit around which current i will flow. The current i is used to linearize the crosspoints without otherwise affecting the communication path.

Voltage sources 27 and 28 should be chosen to be equal and to have a total voltage slightly greater than the sum of the voltage drops of all eight gated diode switch crosspoints around the completed circuit. Since the sum of voltage drops around the completed circuit is 16 volts, each voltage source 27 and 28 can supply, for example, 9 volts. The amount of current i flowing around the completed circuit should be sufficient to maintain the crosspoints in a substantially linear region over the full range of signals to be transmitted to the subscriber loop (see FIG. 3). In the present example, a 10 milliamp circulating current i has been found to be sufficient. Since 10 milliamps provides a sufficiently linear crosspoint at 2 volts, resistances 29 and 36 should be chosen to drop approximately 1 volt each at 10 milliamps. Accordingly, in the present example, resistances 29 and 36 should each equal 100 ohms. When the DC resistance of the crosspoints is significant, this resistance should be considered when selecting the value for resistors 29 and 36. For example, when each crosspoint has a resistance of 10 ohms, the total crosspoint resistance is equal to 80 ohms. In order to maintain 200 ohms around the completed circuit, each resistor 29 and 36 would have to have a resistance of 60 ohms. In an application where it is important to carefully balance the current flow through the two separate conduction paths, the voltage values of voltage sources 27 and 28 can be adjusted just prior to testing via a given path. Similar voltage sources and resistances are used to linearize the ring conductor communication paths.

When voltage sources 27 and 28 are equal, the voltage applied by these sources to conductor 38 will be substantially identical to the voltage applied to the loop conductor 13. In situations where the voltages at conductor 38 and loop conductor 13 need not be the same, voltage sources 27 and 28 can differ, provided the sum of the voltages applied is slightly greater than the sum of the crosspoint voltage drops around the loop. In fact, a single voltage supply, e.g., voltage supply 27 can be used in such a situation provided that voltage supply 28 is replaced with a short circuit.

Compensation Circuit 500-Linear Compensation

Recall that for the gated diode switches of the present embodiment, a gate voltage which exceeds the higher of the voltages applied to the anode or cathode by 30 to 40 volts is required to make the gated diode switch nonconductive. In the present embodiment, approximately 300 volts is applied by concentrator controller 45 via the conductors 56 to the crosspoint gate terminals since concentrator/expander 10 is used to transmit relatively high voltages, e.g., ringing voltages and leakage test voltages, to subscriber loops. The gated diode switch crosspoints allow significant leakage currents to flow from the device gate terminal to both the anode and cathode terminals. This is true not only for the conductive crosspoints comprising a given communication path but also for the many nonconductive crosspoints connected to that path. The leakage current that flows through each crosspoint varies with temperature, the voltage applied to the communication path and the particular device characteristics of that crosspoint. In addition, biasing resistors, e.g., resistors R11, R12, R21, R22, R31 and R32 for the illustrative communication path shown in FIG. 1, are distributed throughout tip network 17 to prevent the leakage current from so charging the communication paths that the crosspoints become conductive in an uncontrolled manner. The current which flows through these biasing resistors can vary even more significantly with the applied voltage than does the leakage current.

In accordance with the present invention, a compensation circuit 500 is used to compensate for the above-described leakage current and biasing effects within tip network 17 and tip access circuit 21 and a substantially identical compensation circuit 500' is used to compensate for those effects within ring network 18 and ring access circuit 22. Before testing via a given path through tip network 17 and tip access circuit 21, compensation circuit 500 first determines a voltage-current characteristic for the given path. Then, during testing, compensation circuit 500 supplies a current to the path as defined by the determined voltage-current characteristic.

When measurements are to be made via, for example, the path shown by heavy line within tip network 17 and tip access circuit 21 in FIG. 1, all of the crosspoints of that path are controlled to be conductive except those closest to the subscriber loop, i.e., crosspoints 46 and 50, and switch 61 is opened so that no voltage is applied by test circuit 23. In accordance with one exemplary method of determining the voltage-current characteristic of the path, compensation circuit 500 applies a first test voltage, $V_1$, and then a second test voltage, $V_2$, via conductor 60 and linearizing circuit 26 to the path. When the first test voltage, $V_1$, is applied, compensation circuit 500 determines a constant, $K_1$, such that the current, $I_1$, which is supplied by compensation circuit 500 via conductor 60 is given by $$I_1 = K_1(V_1 - V_2). \tag{1}$$

Compensation circuit 500 then stores a digital word representing the constant, $K_1$, and removes the voltage, $V_1$. When the second test voltage, $V_2$, is applied, compensation circuit 500 determines a constant, $K_2$, such that the current, $I_2$, which is supplied by compensation circuit 500 is given by $$I_2 = K_2(V_2 - V_1). \tag{2}$$

Compensation circuit 500 then stores a digital word representing the constant, $K_2$, and removes the voltage, $V_2$.

Once the digital words representing the constants $K_1$ and $K_2$ have been stored by compensation circuit 500, crosspoints 46 and 50 are controlled to be conductive, switch 61 is closed and various voltages are applied by test circuit 23 via conductor 38, switch 61, conductor 60, linearizing circuit 26 and the separate conduction paths to tip conductor 13 as measurements are made. For any given voltage, V, applied by test circuit 23 to conductor 60, compensation circuit 500 supplies a current, I, to conductor 60 according to the voltage-current characteristic given by $$I = K_1(V - V_2) + K_2(V - V_1). \tag{3}$$

Equation (3) is the equation of a straight line used to approximate the voltage-current characteristic of a particular test access path.

When voltage is applied via an ideal test access line to an open circuit, no current flows in that line. The current supplied by compensation circuit 500 during testing compensates for the variation of the particular test access path from an ideal line. Since this current is supplied by compensation circuit 500 rather than test circuit 23, the accuracy of measurements made by test circuit 23 is not degraded by the nonideal test access line. By determining the constants $K_1$ and $K_2$ for a given path through tip network 17 and tip access circuit 21 just prior to testing via that path, the effects of device differences and temperature variations are minimized. The operation of compensation circuit 500' in compensating for the leakage and biasing within ring network 19 and ring access circuit 22 is substantially identical to that of compensation circuit 500. Of course, different constants are determined which depend on the particular test access path through ring network 18 and ring access circuit 22.

Figure 6:
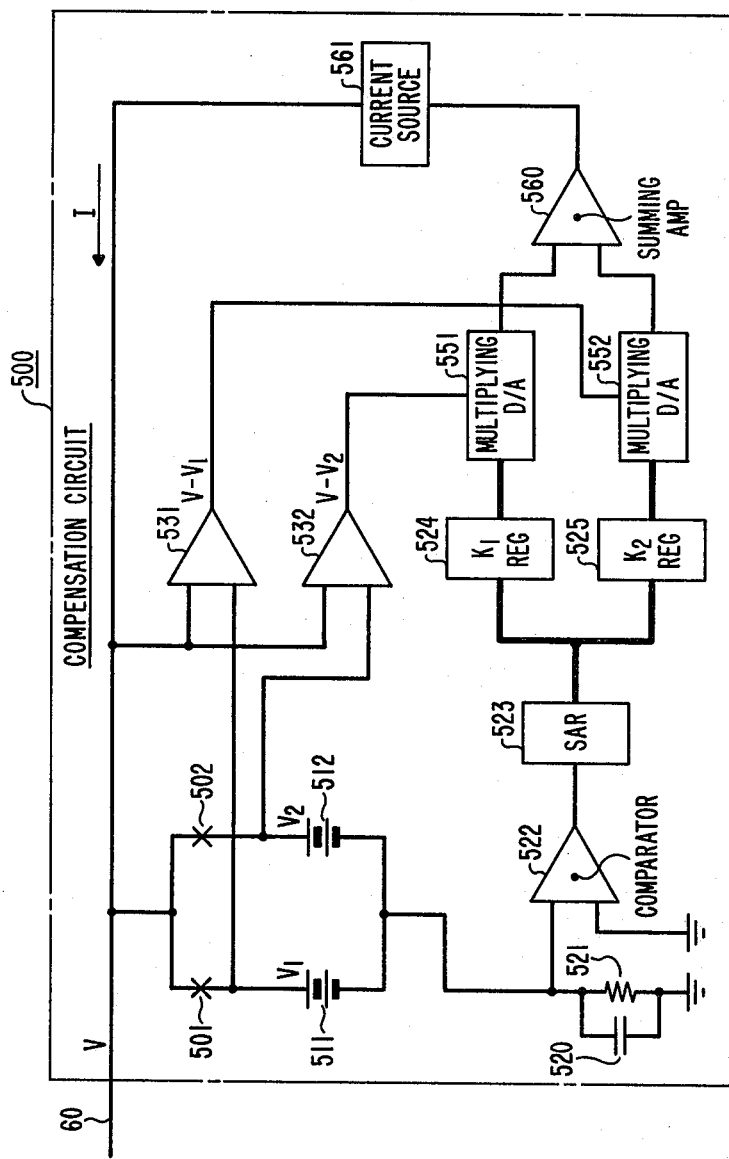
FIG. 6 is a circuit diagram of a compensation circuit used in accordance with the present invention for linear compensation in the arrangement of FIG. 1.

Compensation circuit 500, which is shown in FIG. 6, includes two voltage supplies 511 and 512 having voltage values $V_1$ and $V_2$, respectively. Voltage supply 511 is connected via a normally-open switch 501 to conductor 60 and via a resistor 521 to ground and voltage supply 512 is connected via a normally-open switch 502 to conductor 60 and via resistor 521 to ground. To determine the constant, $K_1$, switch 501 is closed so that the voltage, $V_1$, is applied by voltage supply 511 to conductor 60. The voltage across resistor 521, which voltage is proportional to the current flow through voltage supply 511, is transmitted to a first input terminal of a comparator 522. The second input terminal of comparator 522 is connected to ground. When the voltage across resistor 521 is positive, comparator 522 transmits a logic zero signal to a successive approximation register 523, e.g., the National Semiconductor 54C905. When the voltage across resistor 521 is negative, comparator 522 transmits a logic one signal to successive approximation register 523. A capacitor 520 is connected in parallel with resistor 521 to minimize the effect on comparator 522 of any noise voltages on conductor 60. Successive approximation register 523 is initialized to the 10-bit word 0111111111, the value of which is approximately one-half that of the maximum value 10-bit word 1111111111. In response to the logic signal from comparator 522, successive approximation register 523 determines a 10-bit word representing a first approximation of the constant, $K_1$, and transmits that 10-bit word to a register 524 for storage therein. When comparator 522 transmits a logic zero signal, successive approximation register 523 determines the 10-bit word 0011111111, which is approximately midway between the words 0000000000 and 0111111111 to represent the first approximation of the constant, $K_1$. When comparator 522 transmits a logic one signal, successive approximation register 523 determines the 10-bit word 1011111111, which is approximately midway between the words 0111111111 and 1111111111 to represent the first approximation of the constant, $K_1$. The 10-bit word stored in register 524 is also transmitted to a digital input port of a multiplying D/A converter 551, e.g., the Analog Devices 573OLD. Multiplying D/A converter 511 converts the digital word received at its digital input port to an analog voltage and multiplies that analog voltage by the voltage received at a multiplier input terminal to generate a product voltage. Multiplying D/A converter 511 is offset to, in effect, subtract the word 0111111111 from the digital word received at its digital input port before the D/A conversion. Accordingly, multiplying D/A converter 511 generates a zero voltage when the word 0111111111 is received at its digital input port. A differential amplifier 532 having a first input terminal connected to conductor 60 and a second input terminal connected to the junction between voltage supply 512 and switch 502 transmits a voltage $V-V_2$ to the multipler input terminal of multiplying D/A converter 551, where V represents any voltage on conductor 60. Since voltage supply 511 is applying the voltage $V_1$ to conductor 60, the voltage transmitted by differential amplifier 532 to multiplying D/A converter 551 is $V_1-V_2$. (The contribution of the voltage across resistor 521 to the voltage V on conductor 60 can be ignored as discussed later herein.) Multiplying D/A converter 551 transmits an analog voltage, $K_1(V_1-V_2)$, to a first input terminal of a summing amplifier 560. A second differential amplifier 531 having a first input terminal connected to conductor 60 and a second input terminal connected to the junction between voltage supply 511 and switch 501 transmits a voltage $V-V_1$ to a multipler input terminal of a second multiplying D/A converter 552. Since $V=V_1$ at this time, differential amplifier 531 transmits a zero voltage to the multipler input terminal of multiplying D/A converter 552. Accordingly, multiplying D/A converter 552, which is connected to a second input terminal of summing amplifier 560, transmits a zero voltage thereto. The output terminal of summing amplifier 560 is connected to a voltage input terminal of a voltage-controlled current source 561. Since summing amplifier 560 receives the zero voltage from multiplying D/A converter 552, summing amplifier 560 transmits the voltage, $K_1(V_1-V_2)$, to the voltage input terminal of current source 561. In response thereto, current source 561 supplies the current given by equation (1).

The current supplied by current source 561 results in a different value of current flowing through voltage supply 511 and resistor 521. Depending on the polarity of the voltage across resistor 521, comparator 522 transmits a logic one or a logic zero signal to successive approximation register 523, which determines a 10-bit word representing a second approximation of the constant $K_1$. The 10-bit word is stored in register 524 and by the operation of multiplying D/A converter 551, differential amplifier 532, summing amplifier 560 and current source 561, a new value of current $I_1$, given by equation (4), is supplied by current source 561, reflecting the second approximation of the constant $K_1$. The successive approximations determined by successive approximation register 523 are made such that the voltage across resistor 521, which is proportional to the current through voltage supply 511, is minimized. If, for example, the word 1011111111 was stored in register 524 representing the first approximation of the constant, $K_1$, successive approximation register 523 will, during the second iteration, determine the word 1001111111, midway between the words 0111111111 and 1011111111, if a logic zero signal, indicating a positive voltage across register 521, is received from comparator 522. The process repeats as ten successive approximations are made. After the tenth approximation, the current supplied by current source 561 is such that substantially no current flows through voltage supply 511. This means that substantially all the current supplied by current source 561 flows to conductor 60 and that any voltage supply applying the voltage $V_1$ to conductor 60 will not be required to supply current because of the leakage and biasing effects of the communication path. The term "supplying current" as used herein refers to either positive or negative current flow. After the tenth approximation, switch 501 is opened and the 10-bit word stored in register 524 represents the final approximation of the constant $K_1$.

A similar process is followed to determine the constant $K_2$. Switch 502 is closed and voltage supply 512 applies the voltage, $V_2$, to conductor 60. However, in this case, the 10-bit words determined by successive approximation register 523 are stored in a register 525 and the contents of register 525 are transmitted to the digital input port of multiplying D/A converter 552. Differential amplifier 532 transmits a zero voltage to the multiplier input terminal of multiplying D/A converter 551. The current supplied by current source 561 is given by equation (2). When ten iterations have been completed and the current flowing through voltage supply 512 has been minimized, the 10-bit word stored in register 525 represents the final approximation of the constant $K_2$. Switch 502 is then opened.

Compensation circuit 500 includes a sequencer (not shown), which may be implemented using, for example, a programmable logic array, to control the operation of switches 501 and 502, the sampling of the comparator 522 logic signal by successive approximation register 523 and the enabling of registers 524 and 525 for storing words to achieve the above-described sequence of operations.

When test circuit 23 (FIG. 1) thereafter applies any voltage, V, to conductor 60, and crosspoints 46 and 50 are controlled to be conductive to test the particular subscriber loop including subscriber set 11, current source 561 supplies a current I to conductor 60 according to the voltage-current characteristic given by equation (3).

Figure 8:
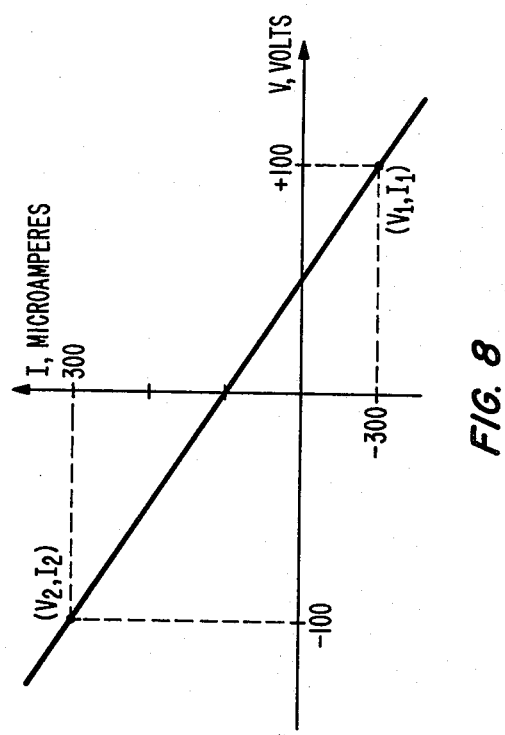
FIG. 8 illustrates a typical voltage-current characteristic determined by the compensation circuit of FIG. 6.

It should be noted that voltages $V_1$ and $V_2$ can be either positive or negative. In a particular exemplary embodiment, $V_1=+100$ volts and $V_2=-100$ volts and the voltage supply 512 is of the opposite polarity of that shown in FIG. 6. These large voltages were selected since they coincide with the voltages used to make accurate subscriber loop leakage measurements during testing. The voltages transmitted to the input terminals of differential amplifiers 531 and 532 are appropriately scaled to be within the amplifier input voltage operating range. In addition, voltage-controlled current source 561 has an associated scale factor relating the output current to the input voltage such that current source 561 supplies currents from $-500$ microamperes to $+500$ microamperes to conductor 60. The scale factors associated with differential amplifiers 531 and 532 and current source 561 can be incorporated into the preceding analysis by appropriately modifying the constants, $K_1$ and $K_2$. In a particular instance, when the voltage $V_1=+100$ volts was applied, current source 561 supplied the current $I_1=-100$ microamperes and when the voltage $V_2=-100$ volts was applied, current source 561 supplied the current $I_2=+300$ microamperes. The voltage-current characteristic determined by compensation circuit 500 in that instance is shown in FIG. 8. Subsequently, when any test voltage V was applied to conductor 60, compensation circuit 500, by the operation of differential amplifiers 531 and 532, multiplifying D/A converters 551 and 552, summing amplifier 560 and current source 561, supplied the current I defined by the characteristic of FIG. 8. The applied voltage V may vary rapidly as, for example, when testing is conducted using a 1000-hertz sinusoidal voltage, and the current I supplied by compensation circuit 500 will vary accordingly to provide linear compensation. Note that in the present embodiment, the circuitry used to supply current as defined by the voltage-current characteristic is also used in determining the characteristic and its associated constants $K_1$ and $K_2$. Recall that the contribution of the voltage across resistor 521 to the voltage V on conductor 60 was ignored in the preceding analysis. This was possible since the voltage across resistor 521 is minimized by the successive approximation process.

Compensation Circuit 600-Higher Order Compensation

Compensation circuit 500 used the equation of a straight line to approximate the voltage-current characteristic of a particular test access path. When a straight line approximation does not provide sufficient accuracy in a given application, compensation circuits 500 and 500' can be replaced by two compensation circuits such as compensation circuit 600, shown in FIG. 7, which uses a third degree polynomial to approximate the voltage-current characteristic. Compensation circuit 600 successively applies four test voltages, $V_1$, $V_2$, $V_3$, and $V_4$ via conductor 60 and linearizing circuit 26 to the test access path. When the first test voltage, $V_1$, is applied, compensation circuit 600 determines a constant, $K_1$, such that the current, $I_1$, which is supplied by compensation circuit 600 via conductor 60 is given by $$I_1 = K_1(V_1 - V_2)(V_1 - V_3)(V_1 - V_4). \qquad (4)$$

Compensation circuit 600 then stores a digital word representing the constant, $K_1$, and removes the voltage, $V_1$. When the second test voltage, $V_2$, is applied, compensation circuit 600 determines a constant, $K_2$, such that the current, $I_2$, which is supplied by compensation circuit 600 is given by $$I_2 = K_2(V_2 - V_1)(V_2 - V_3)(V_2 - V_4). \qquad (5)$$

Compensation circuit 600 then stores a digital word representing the constant, $K_2$, and removes the voltage, $V_2$. When the third test voltage, $V_3$, is applied, compensation circuit 600 determines a constant, $K_3$, such that the current, $I_3$, which is supplied by compensation circuit 600 is given by $$I_3 = K_3(V_3 - V_1)(V_3 - V_2)(V_3 - V_4). \qquad (6)$$

Compensation circuit 600 then stores a digital word representing the constant, $K_3$, and removes the voltage, $V_3$. Finally, when the fourth test voltage, $V_4$, is applied, compensation circuit 600 determines a constant, $K_4$, such that the current, $I_4$, which is supplied by compensation circuit 600 is given by $$I_4 = K_4(V_4 - V_1)(V_4 - V_2)(V_4 - V_3). \qquad (7)$$

Compensation circuit 600 then stores a digital word representing the constant, $K_4$, and removes the voltage, $V_4$.

Once the digital words representing the constants, $K_1$, $K_2$, $K_3$, and $K_4$, have been stored by compensation circuit 600, crosspoints 46 and 50 are controlled to be conductive, switch 61 is closed and various voltages are applied by test circuit 23 via conductor 38, switch 61, conductor 60, linearizing circuit 26 and the separate conduction paths to tip conductor 13 as measurements are made. For any given voltage, V, applied by test circuit 23 to conductor 60, compensation circuit 600 supplies a current, I, to conductor 60 according to the voltage-current characteristic given by $$\begin{aligned} I = &\ K_1(V - V_2)(V - V_3)(V - V_4) \\ &+ K_2(V - V_1)(V - V_3)(V - V_4) \\ &+ K_3(V - V_1)(V - V_2)(V - V_4) \\ &+ K_4(V - V_1)(V - V_2)(V - V_3). \end{aligned} \qquad (8)$$

Equation (8) is the equation of a third degree polynomial which passes through the four points $(V_1, I_1)$, $(V_2, I_2)$, $(V_3, I_3)$ and $(V_4, I_4)$.

Figure 7:
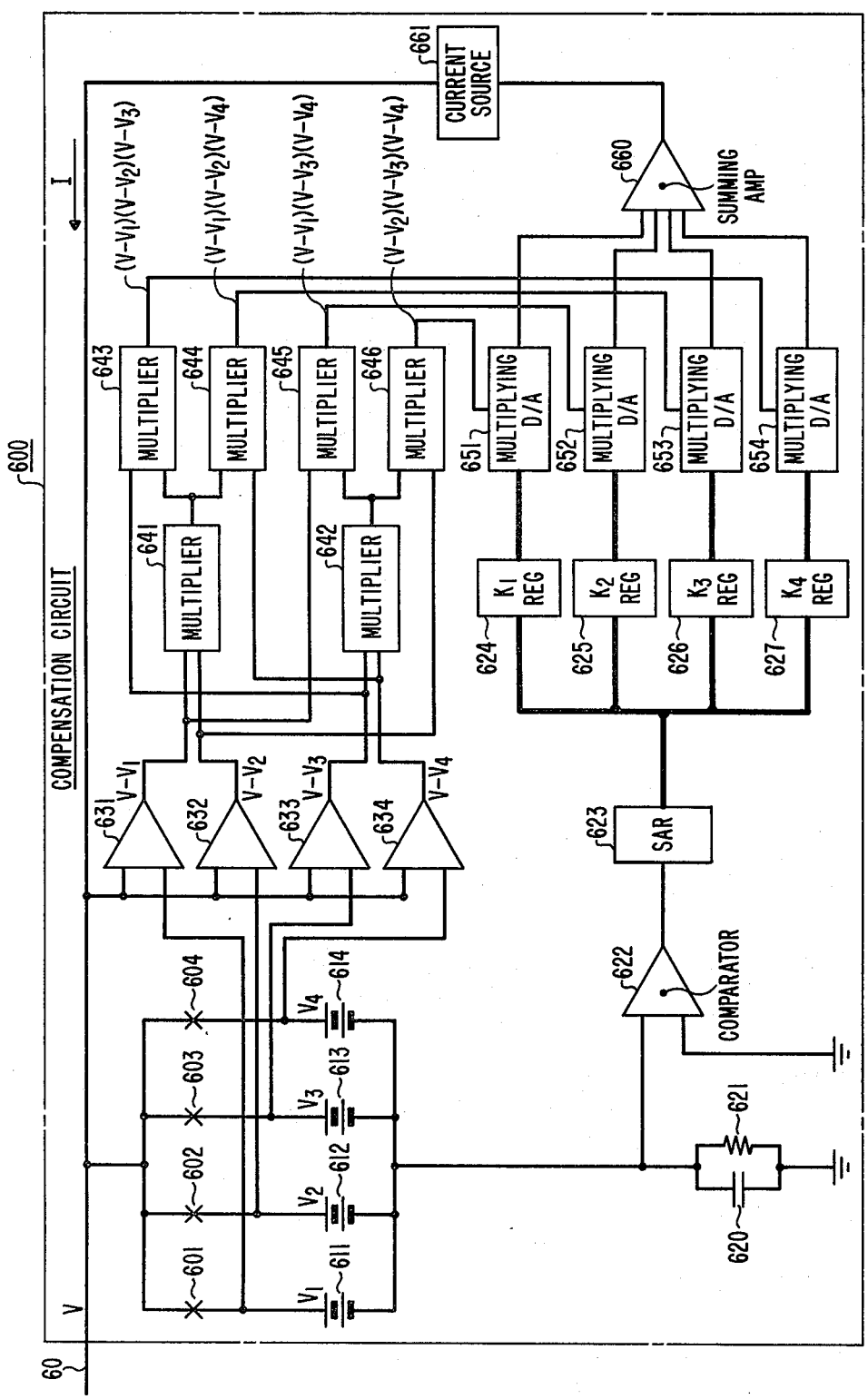
FIG. 7 is a circuit diagram of a compensation circuit used in accordance with the present invention for nonlinear compensation in the arrangement of FIG. 1.

Compensation circuit 600, which is shown in FIG. 7, includes four voltage supplies 611, 612, 613 and 614 having voltage values, $V_1$, $V_2$, $V_3$, and $V_4$, respectively, which values are selected to optimize the accuracy of the determined voltage-current characteristic for the voltages to be used subsequently during testing. Voltage supplies 611, 612, 613, and 614 are each connected via one of four normally-open switches 601, 602, 603 and 604 to conductor 60 and via a resistor 621 to ground. To determine the constant, $K_1$, switch 601 is closed so that the voltage, $V_1$, is applied by voltage supply 611 to conductor 60. The voltage across resistor 621, which voltage is proportional to the current flow through voltage supply 611, is transmitted to a first input terminal of a comparator 622. The second input terminal of comparator 622 is connected to ground. When the voltage across resistor 621 is positive, comparator 622 transmits a logic zero signal to a successive approximation register 623. When the voltage across resistor 621 is negative, comparator 622 transmits a logic one signal to successive approximation register 623. A capacitor 620 is connected in parallel with resistor 621 to minimize the effect on comparator 622 of any noise voltages on conductor 60. In response to the logic signal from comparator 622, successive approximation register 623 determines a 10-bit word representing a first approximation of the constant, $K_1$, and transmits that 10-bit word to a register 624 for storage therein. The ten-bit word stored in register 624 is also transmitted to a digital input port of a multiplying D/A converter 651. Four differential amplifiers 631, 632, 633 and 634, each having a first input terminal connected to one of the voltage supplies 611, 612, 613 and 614 and having a second input terminal connected to conductor 60, respectively transmit the voltages $V - V_1$, $V - V_2$, $V - V_3$, and $V - V_4$ to an arrangement of six multipliers 641 though 646, e.g., the Analog Devices 534T. Each of the multipliers 641 through 646 generates an analog product voltage by multiplying the analog voltages received at its two input terminals. The arrangement of multipliers 641 through 646 is such that multipliers 643, 644, 645 and 646 respectively generate the product voltages $$(V - V_1)(V - V_2)(V - V_3),$$

$$(V - V_1)(V - V_2)(V - V_4),$$

$$(V - V_1)(V - V_3)(V - V_4) \text{ and}$$

$$(V - V_2)(V - V_3)(V - V_4).$$

Since voltage supply 611 is applying the voltage $V_1$ to conductor 60, the voltage transmitted by multiplier 646 to a multiplier terminal of multiplying D/A converter 651 is $(V_1 - V_2)(V_1 - V_3)(V_1 - V_4)$. Multiplying D/A converter 651 transmits the analog voltage, $K_1(V_1-V_2)(V_1-V_3)(V_1-V_4)$ to a first input terminal of a summing amplifier 600. Since $V=V_1$, multipliers 645, 644, and 643 each transmit a zero voltage to a multiplier input terminal of a respective one of three multiplying D/A converters 652, 653 and 654. Accordingly, multiplying D/A converters 652, 653 and 654 each transmit a zero voltage to a respective one of three additional summing amplifier 660 input terminals. The output terminal of summing amplifier 660 is connected to a voltage input terminal of a voltage-controlled current source 661. Since summing amplifier 660 receives zero voltages from multiplying D/A converters 652, 653 and 654, summing amplifier 660 transmits the voltage, $K_1(V_1-V_2)(V_1-V_3)(V_1-V_4)$, to the voltage input terminal of current source 661. In response thereto, current souce 661 supplies the current given by equation (4).

The current supplied by current source 661 results in a different value of current flowing through voltage supply 611 and resistor 621. Depending on the polarity of the voltage across resistors 621, comparator 622 transmits a logic one or a logic zero signal to successive approximation register 623, which determines a 10-bit word representing a second approximation of the constant $K_1$. The 10-bit word is stored in register 624 and by the operation of multiplying D/A converter 651, the arrangement of four differential amplifiers 631 through 634 and six multipliers 641 through 646, summing amplifier 660 and current source 661, a new value of current $I_1$, given by equation (4), is supplied by current source 661, reflecting the second approximation of the constant $K_1$. The successive approximations determined by successive approximation register 623 are made such that the voltage across resistor 621, which is proportional to the current through voltage supply 611, is minimized. The process repeats as ten successive approximations are made. After the tenth approximation, the current supplied by current source 661 is such that substantially no current flows through voltage supply 611. Switch 601 is opened and the 10-bit word stored in register 624 represents the final approximation of the constant $K_1$. Similar processes are followed to determine the constants $K_2$, $K_3$, $K_4$. The 10-bit words representing the final approximations of the constants $K_2$, $K_3$, and $K_4$ are stored in registers 625, 626, and 627, respectively.

Compensation circuit 600 includes a sequencer (not shown) which may be implemented using, for example, a programmable logic array, to control the operation of switches 601 through 604, the sampling of the comparator 622 logic signal by successive approximation register 623 and the enabling of registers 624 through 627 for storing words to achieve the above-described sequence of operations.

When test circuit 23 (FIG. 1) thereafter applies any voltage, V, to conductor 60, and crosspoints 46 and 50 are controlled to be conductive to test the particular subscriber loop including subscriber set 11, current source 661 supplies a current I to conductor 60 according to the voltage-current characteristic given by equation (8).

The above-described method can be generalized to compensate for the nonideal voltage-current characteristic of a test access line using a polynomial of degree $n-1$. In this more general case, a voltage supply successively applies test voltages $V_i$, for successive integers i from one through n, to the test access line, where n is a positive integer greater than one. For each of the test voltages $V_i$, a current $I_i$ is supplied to the test access line of magnitude and polarity such that substantially no current flows through the voltage supply. For each of the test voltages $V_i$, a constant $K_i$ is determined such that $$I_i = K_i \prod_{\substack{j=1 \\ j \neq i}}^{n} (V_i - V_j). \tag{9}$$

The voltage-current characteristic is then given by $$I(V) = \sum_{i=1}^{n} \left[ K_i \prod_{\substack{j=1 \\ j \neq i}}^{n} (V - V_j) \right]. \tag{10}$$

The symbol "$\Pi$" in equations (9) and (10) refers to product. For example, $$\prod_{\substack{j=1 \\ j \neq 4}}^{5} (V - V_j) = (V - V_1)(V - V_2)(V - V_3)(V - V_5). \tag{11}$$

Equation (10) defines the only polynomial of degree n-1 passing through the n points $(V_1, I_1)$, $(V_2, I_2) \ldots (V_n, I_n)$, a result credited to Lagrange and described in the book, by R. W. Hamming, *Numerical Methods for Scientists and Engineers*, copyright 1962, pages 94–97. For $n=2$, equations (3) and (10) are identical. For $n=4$, equations (8) and (10) are identical. The approach can be further generalized. If $P_{i,n}$ and $P'_{i,n}$ are given by $$P_{i,n} = \prod_{\substack{j=1 \\ j \neq i}}^{n} (V - V_j) \text{ and} \tag{12}$$

$$P'_{i,n} = \prod_{\substack{j=1 \\ j \neq i}}^{n} (V_i - V_j) \tag{13}$$

and if each constant, $K_i$, is determined such that $$I_i = K_i f_i(P'_{i,n}), \tag{14}$$

then the voltage-current characteristic can be given by $$I(V) = \sum_{i=1}^{n} [K_i f_i(P_{i,n})] \tag{15}$$

where the n functions $f_i$ have the property that $$f_i(0) = 0, \tag{16}$$

for successive integers i from one through n. Or, if each constant, $K_i$, is determined such that $$I_i = K_i \prod_{\substack{j=1 \\ j \neq i}}^{n} g_j(V_i - V_j) \tag{17}$$

where the n functions $g_j$ have the property that $$g_j(0) = 0, \tag{18}$$

for successive integers j from one through n, then the voltage-current characteristic can be given by $$I(V) = \sum_{i=1}^{n} \left[ K_i \prod_{\substack{j=1 \\ j \neq i}}^{n} g_j(V - V_j) \right] . \quad (19)$$

Other curve-fitting techniques could be used to determine the voltage-current characteristic from the n points $(V_1, I_1), (V_2, I_2), \ldots (V_n, I_n)$.

The preceding description is related to a subscriber loop test arrangement which utilized a concentrator/expander 10 as the subscriber loop selector. The use of other types of networks and the transmission and reception of other types of signals are clearly within the scope of the present invention. Further, the prior description related to networks using gated diode switch crosspoints. The present invention clearly applies equally well to other types of semiconductor crosspoints, such as crosspoints made from PNPN devices.

It is to be understood that the above-described embodiments are merely illustrative of the principles of the invention and that other arrangements may be devised by those skilled in the art without departing from the spirit and scope of the invention.

What is claimed is:

1. A method of compensating for the variation of a test access line from an ideal insulated line comprising
   determining a voltage-current characteristic for said test access line and
   supplying to said test access line, for any voltage, V, applied to said test access line, the magnitude and polarity of current defined by said voltage-current characteristic for that voltage, V.

2. A method in accordance with claim 1 wherein said determining step comprises applying a test voltage to said line and measuring current in said line.

3. A method in accordance with claim 1 wherein said determining step comprises
   successively applying test voltages, $V_i$, for successive integers i from one through n, to said test access line, n being a positive integer greater than one,
   measuring, for each of said test voltages, $V_i$, applied to said test access line, a current, $I_i$, in said test access line and
   determining said voltage-current characteristic from the set of points $(V_i, I_i)$.

4. A method in accordance with claim 1 wherein said determining step comprises
   successively applying test voltages, $V_i$, for successive integers i from one through n, to said test access line, n being a positive integer greater than one,
   measuring, for each of said test voltages, $V_i$, applied to said test access line, a current, $I_i$, in said test access line and
   determining said voltage-current characteristic from the set of points $(V_i, I_i)$, such that said voltage-current characteristic passes through each point of said set of points.

5. A method in accordance with claim 1 wherein said determining step comprises
   successively applying, by a voltage-applying means, test voltages $V_i$, for successive integers i from one through n, to said test access line, n being a positive integer greater than one,
   supplying, for each of said test voltages $V_i$ applied to said test access line, a current, $I_i$, to said test access line of magnitude and polarity such that substantially no current flows through said voltage-applying means,
   determining, for each of said test voltages $V_i$, a constant $K_i$ such that $$I_i = K_i \prod_{\substack{j=1 \\ j \neq i}}^{n} (V_i - V_j)$$

and
   determining said voltage-current characteristic as $$I(V) = \sum_{i=1}^{n} \left[ K_i \prod_{\substack{j=1 \\ j \neq i}}^{n} (V - V_j) \right] .$$

6. A method in accordance with claim 1 wherein said determining step comprises
   successively applying, by a voltage-applying means, test voltages $V_i$, for successive integers i from one through n, to said test access line, n being a positive integer greater than one,
   supplying, for each of said test voltages $V_i$ applied to said test access line, a current, $I_i$, to said test access line of magnitude and polarity such that substantially no current flows through said voltage-applying means,
   determining, for each of said test voltages $V_i$, a constant $K_i$ such that $$I_i = K_i f_i(P_{i,n})$$

where $$P_{i,n} = \prod_{\substack{j=1 \\ j \neq i}}^{n} (V_i - V_j)$$

and where the n functions $f_i$ have the property that $$f_i(0) = 0,$$

for successive integers i from one through n, and determining said voltage-current characteristic as $$I(V) = \sum_{i=1}^{n} [K_i f_i(P_{i,n})]$$

where $$P_{i,n} = \prod_{\substack{j=1 \\ j \neq i}}^{n} (V - V_j).$$

7. A method in accordance with claim 1 wherein said determining step comprises
   successively applying, by a voltage-applying means, test voltages, $V_i$, for successive integers i from one through n, to said test access line, n being a positive integer greater than one,
   supplying, for each of said test voltages, $V_i$ applied to said test access line, a current $I_i$, to said test access line of magnitude and polarity such that substantially no current flows through said voltage-applying means, determining, for each of said test voltages $V_i$, a constant $K_i$ such that $$I_i = K_i \prod_{\substack{j=1 \\ j \neq i}}^{n} g_j(V_i - V_j),$$

where the n functions $g_j$ have the property that $$g_j(0) = 0,$$

for successive integers j from one through n, and determining said voltage-current characteristic as $$I(V) = \sum_{i=1}^{n} \left[ K_i \prod_{\substack{j=1 \\ j \neq i}}^{n} g_j(V - V_j) \right].$$

8. A method of compensating for the variation of a test access line from an ideal insulated line comprising:
  successively applying, by a voltage-applying means, test voltages $V_i$, for successive integers i from one through n, to said test access line, n being a positive integer greater than one,
  supplying, for each of said test voltages $V_i$ applied to said test access line, a current, $I_i$, to said test access line of magnitude and polarity such that substantially no current flows through said voltage-applying means,
  determining, for each of said test voltages $V_i$, a constant $K_i$ such that $$I_i = K_i \prod_{\substack{j=1 \\ j \neq i}}^{n} (V_i - V_j)$$

and
supplying to said test access line, for any voltage, V, applied to said test access line, the magnitude and polarity of current defined by $$I(V) = \sum_{i=1}^{n} \left[ K_i \prod_{\substack{j=1 \\ j \neq i}}^{n} (V - V_j) \right].$$

9. A method in accordance with claim 8 wherein said first-mentioned supplying step further comprises
  repetitively making comparisons between the current flow through said voltage-applying means and zero current,
  supplying, in response to each of said comparisons, a magnitude and polarity of current to said test access line to reduce the current flow through said voltage-applying means.

10. A method in accordance with claim 8 wherein said last-mentioned supplying step further comprises
  generating n difference voltages, $V - V_i$, by subtracting each of said test voltages $V_i$ from said voltage V,
  generating each of n product voltages, $$\prod_{\substack{j=1 \\ j \neq i}}^{n} (V - V_j),$$

by multiplying together all but an associated one of said n difference voltages,
generating each of n scaled product voltages, $$K_i \prod_{\substack{j=1 \\ j \neq i}}^{n} (V - V_j),$$

by multiplying one of said n product voltages by an associated one of said constants, $K_i$,
generating a sum voltage by adding said n scaled product voltages together and
supplying to said test access line a current substantially proportional to said sum voltage.

11. A method of determining a voltage-current characteristic for a test access line comprising:
  successively applying, by a voltage-applying means, test voltages $V_i$, for successive integers i from one through n, to said test access line, n being a positive integer greater than one,
  supplying, for each of said test voltages $V_i$ applied to said test access line, a current, $I_i$, to said test access line of magnitude and polarity such that substantially no current flows through said voltage-applying means,
  determining, for each of said test voltages $V_i$, a constant $K_i$ such that $$I_i = K_i \prod_{\substack{j=1 \\ j \neq i}}^{n} (V_i - V_j)$$

and
determining said voltage-current characteristic as $$I(V) = \sum_{i=1}^{n} \left[ K_i \prod_{\substack{j=1 \\ j \neq i}}^{n} (V - V_j) \right].$$

12. In an arrangement for testing telephone subscriber loop circuits comprising
  a switching network having input ports and output ports and a plurality of crosspoints,
  means connecting a given subscriber loop circuit to one of said input ports,
  control means for controlling predetermined ones of said plurality of crosspoints to be conductive to establish a conduction path between one of said output ports and said one of said input ports,
  current source means for supplying current to said one of said output ports and
  voltage source means for applying voltage to said one of said output ports,
  a method of testing said given subscriber loop circuit comprising
  controlling, by said control means, less than all of said predetermined crosspoints to be conductive,
  determining a voltage-current characteristic at said one of said output ports,
  controlling, by said control means, all of said predetermined crosspoints to be conductive,
  applying, by said voltage source means, a voltage, V, to said one of said output ports and
  supplying to said one of said output ports, by said current source means, the magnitude and polarity of current defined by said voltage-current characteristic for said voltage, V.

13. In an arrangement for testing telephone subscriber loop circuits comprising
a switching network having input ports and output ports and a plurality of crosspoints,
means connecting a given subscriber loop circuit to one of said input ports,
control means for controlling predetermined ones of said plurality of crosspoints to be conductive to establish a conduction path between one of said output ports and said one of said input ports,
current source means for supplying current to said one of said output ports and
voltage source means for applying voltage to said one of said output ports,
a method of testing said given subscriber loop circuit comprising
controlling, by said control means, less than all of said predetermined crosspoints to be conductive,
successively applying, by said voltage source means, test voltages $V_i$, for successive integers i from one through n, to said one of said output ports, n being a positive integer greater than one,
supplying, by said current source means for each of said test voltages $V_i$ applied to said one of said output ports, a current, $I_i$, to said one of said output ports of magnitude and polarity such that substantially no current flows through said voltage source means,
determining, for each of said test voltages $V_i$, a constant $K_i$ such that $$I_i = K_i \prod_{\substack{j=1 \\ j \neq i}}^{n} (V_i - V_j)$$

controlling, by said control means, all of said predetermined crosspoints to be conductive,
applying, by said voltage source means, a voltage, V, to said one of said output ports and
supplying to said one of said output ports, by said current source means, the magnitude and polarity of current defined by $$I(V) = \sum_{i=1}^{n} \left[ K_i \prod_{\substack{j=1 \\ j \neq i}}^{n} (V - V_j) \right].$$

14. An arrangement for compensating for the variation of a test access line from an ideal insulated line comprising
voltage-applying means for successively applying test voltages $V_i$, for successive integers i from one through n, to said test access line, n being a positive integer greater than one,
current supplying means for supplying, for each of said test voltages $V_i$ applied to said test access line, a current, $I_i$, to said test access line of magnitude and polarity such that substantially no current flows through said voltage-applying means and
means for determining, for each of said test voltages $V_i$, a constant $K_i$ such that $$I_i = K_i \prod_{\substack{j=1 \\ j \neq i}}^{n} (V_i - V_j),$$

wherein said voltage-applying means further comprises means for applying a voltage, V, to said test access line and
wherein said current supplying means comprises means for supplying to said test access line the magnitude and polarity of current defined by $$I(V) = \sum_{i=1}^{n} \left[ K_i \prod_{\substack{j=1 \\ j \neq i}}^{n} (V - V_j) \right].$$

* * * * *